(12) United States Patent
Moriya

(10) Patent No.: US 7,787,043 B2
(45) Date of Patent: Aug. 31, 2010

(54) LENS APPARATUS FOR CONTROLLING AN INITIAL VALUE

(75) Inventor: Chikatsu Moriya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 381 days.

(21) Appl. No.: 11/892,898

(22) Filed: Aug. 28, 2007

(65) Prior Publication Data

US 2008/0055458 A1    Mar. 6, 2008

(30) Foreign Application Priority Data

Aug. 29, 2006    (JP)    ............................... 2006-232588

(51) Int. Cl.
*G02B 13/16*    (2006.01)
*H04N 5/225*    (2006.01)
*H04N 5/232*    (2006.01)
*H04N 5/238*    (2006.01)
*G03B 13/00*    (2006.01)
*G03B 17/00*    (2006.01)

(52) U.S. Cl. ........................ 348/335; 348/347; 348/363; 396/529; 396/532

(58) Field of Classification Search ................. 348/335, 348/363, 347, 360; 396/529–533
See application file for complete search history.

(56) References Cited

U.S. PATENT DOCUMENTS 4,945,376 A * 7/1990 Kawasaki et al. ............. 396/93
6,717,618 B1 * 4/2004 Yoshikawa ................... 348/360
7,035,021 B2 * 4/2006 Sasaki et al. ................. 359/701
7,362,353 B2 * 4/2008 Kikuchi et al. ......... 348/207.99
2004/0165078 A1    8/2004 Sasaki et al.

FOREIGN PATENT DOCUMENTS

JP    11-98198 A    4/1999

* cited by examiner

*Primary Examiner*—Lin Ye
*Assistant Examiner*—Chia-Wei A Chen
(74) *Attorney, Agent, or Firm*—Birch, Stewart, Kolasch & Birch, LLP

(57) ABSTRACT

Provided is a lens apparatus in which serial communication and parallel communication between a camera body and the lens apparatus are performed and resumption of the serial communication is accomplished after occurrence of a communication error, and controlling of a controlled object being controlled through the parallel communication is transferred to temporally controlling through the serial communication, in which, by setting a state of the controlled object when the controlling is transferred to controlling through the serial communication, to be coincident with a state during controlling through the parallel communication, the controlled object to be controlled through the parallel communication is not affected by an effect caused due to a communication error in the serial communication.

2 Claims, 2 Drawing Sheets

LENS APPARATUS FOR CONTROLLING AN INITIAL VALUE

BACKGROUND OF THE INVENTION

1. Field of the Invention

The present invention relates to a lens apparatus, and particularly to a lens apparatus removably attached to a camera body of a TV camera, etc., in which transmission of various signals with the camera body can be provided in both a serial transmission system (serial communication) and a parallel transmission system (parallel communication).

2. Description of the Related Art

A lens apparatus removably attached to a camera body (camera head) of a TV camera for broadcasting is also electrically connected to an electric connector of the camera body and communicates various signals with the camera body. A transmission scheme by which the camera body communicates signals with the lens apparatus may be a system using a serial transmission system, a parallel transmission system or both systems. In the serial transmission system, a plurality of pieces of information is transmitted through one line (signal line) in a form of digital serial signal, and in the parallel transmission system, a plurality of pieces of information is classified by a type of information as a low (L) level signal and a high (H) level signal, or converted into an analog signal (hereinafter, called the "parallel signal"), and the signals are transmitted through a plurality of lines.

In addition, a communication system in which a signal is communicated by the serial transmission system is herein called the "serial communication", and on the contrary, a communication system in which a signal is communicated by the parallel transmission system is herein called the "parallel communication".

On the one hand, there is known a lens apparatus capable of communicating a signal with a camera body through both systems of the serial communication and the parallel communication so that the lens apparatus can communicate with any of camera bodies which may have only the serial communication system, only the parallel communication system or both of them (see Japanese Patent Application Laid-Open No. 11-98198).

SUMMARY OF THE INVENTION

When a lens apparatus communicates with a camera body through both systems of the serial communication and the parallel communication, a communication error sometimes occurs during the serial communication. At this time, the serial communication is initialized and subsequently, the serial communication is resumed.

On the one hand, in the lens apparatus, it is specified that, at the start of the serial communication, with respect to all controlled objects to be controlled according to a control signal from the camera body, controlling is started through the serial communication (controlling by receiving a control signal through the serial communication), and so, all the controlled objects are set to preset initial values, or to values by which the controlled objects were controlled through the serial communication before the communication error occurred. Therefore, at the time of resumption of the serial communication, the controlled object to be controlled through the parallel communication is also changed to the predetermined initial value, and subsequently, controlling of the controlled object is transferred from controlling through the serial communication to controlling through the parallel communication. Therefore, a problem arises that, when a communication error occurs in the serial communication, a controlled object to be controlled through the parallel communication also becomes uncontrollable, and at the same time, a state of the controlled object is changed independently of the control signal through the parallel communication.

The present invention was made from the viewpoint of such circumferences, and an object of the present invention is to provide a lens apparatus in which a controlled object which is being controlled through the parallel communication is not affected by an effect of a communication error, even when the communication error occurs in the serial communication between the lens apparatus and a camera body.

To achieve the object described above, a lens apparatus according to a first aspect of the present invention is a lens apparatus removably attached to a camera body and including an optical system for forming an object image on an image sensing element of the camera body, comprising: a parallel control device which controls a predetermined controlled object based on a control signal provided by the camera body through parallel communication; and a serial control device which controls the controlled object based on a control signal provided by the camera body through serial communication, in which it is specified that, when the controlled object is controlled by the parallel control device, once the serial communication is started, the controlled object is set to a predetermined initial value for the case where the controlled object is controlled by the serial control device, and subsequently, controlling of the controlled object is shifted to controlling by the parallel control device, comprising: an initial value changing device which changes an initial value based on the control signal provided through the parallel communication, when the controlled object is controlled by the parallel control device, in which, even if, at the start of the serial communication, the controlled object is set to a predetermined initial value for the case where the controlled object is controlled by the serial control device, the initial value is changed without changing a state of the controlled object.

According to the present invention, when the serial communication is resumed to be started again after occurrence of a communication error in the serial communication, even if the controlled object to be controlled through the parallel communication is set to the initial value for the serial communication, a state of the controlled object can not be changed.

A lens apparatus according to a second aspect of the present invention is the lens apparatus according to the first aspect, wherein the controlled object is a diaphragm of the imaging optical system. The present invention shows a specific example of the controlled object controlled based on the control signal provided by the camera body.

According to a lens apparatus of the present invention, even when a communication error occurs in the serial communication with a camera body, the controlled object being controlled through the parallel communication can be controlled not to be affected by an effect of the communication error.

DETAILED DESCRIPTION OF THE PREFERRED EMBODIMENTS

Now, the best embodiment for implementing a lens apparatus according to the present invention will be hereinafter described in detail with reference to the accompanying drawings.

Figure 1:
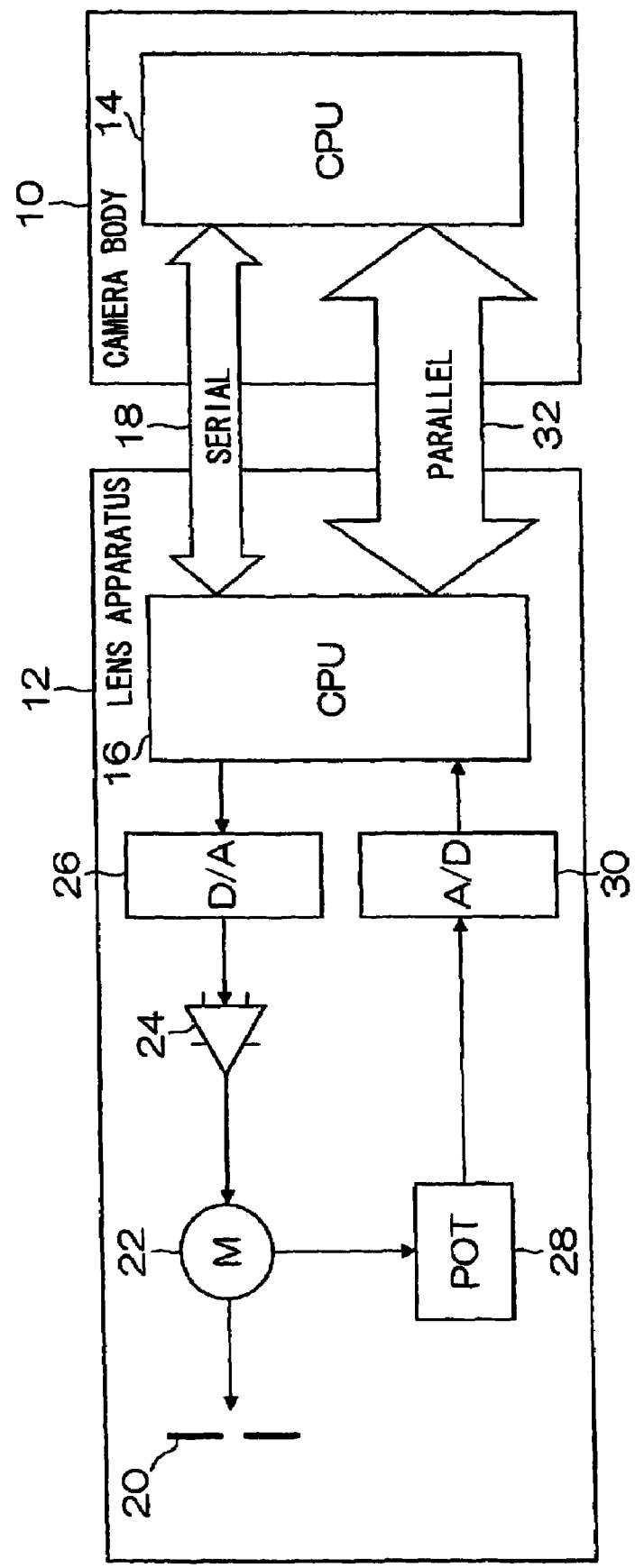
FIG. 1 is a block diagram illustrating, as an example, a configuration of diaphragm control in a lens apparatus electrically connected to a camera body of a TV camera.

FIG. 1 is a block diagram illustrating, as an example, a configuration of diaphragm control in a lens apparatus 12 electrically connected to a camera body 10 of a TV camera.

As shown in FIG. 1, in the camera body 10 and the lens apparatus 12, a CPU 14, 16 for controlling together is installed, respectively, and various signals can be communicated between the CPUs 14 and 16 thereof. The lens apparatus 12 can communicate with the camera body 10 through both systems of serial communication and parallel communication. A type of the camera body 10 may include a type which communicates with the attached lens apparatus 12 only through the serial communication, a type which communicates only through the parallel communication, and a type which communicates through both systems, and in this embodiment, a case where the lens apparatus 12 is attached to the camera body 10 of the type which communicates through both systems is illustrated.

As shown in FIG. 1, communication of signals between the CPU 14 of the camera body 10 and the CPU 16 of the lens apparatus 12 is configured to be performed using both systems of the serial communication through a predetermined signal line 18 and the parallel communication through a predetermined signal line 32. In addition, herein, the serial communication means a communication system using a serial transmission system in which a plurality of pieces of information is transmitted and received through one signal line in a form of digital serial signal, and the parallel communication is a communication system using a parallel transmission system through a predetermined signal line in which a plurality of pieces of information is transmitted and received through a plurality of signal lines, as a low (L) level signal and a high (H) level signal classified by a type of information, or a converted analog signal (parallel signal).

The signal communicated between the CPU 14 of the camera body 10 and the CPU 16 of the lens apparatus 12 may include, for example, a return signal which switches a projected image on a view finder of the camera body 10 between its own image and an image of another camera in a controller attached or connected to the lens apparatus 12, and a position signal which indicates a current position of various controlled objects (focus, zoom or diaphragm) in the lens apparatus 12.

On the one hand, the signal communicated through the parallel communication may include, for example, an iris control signal. The iris control signal is a signal which indicates a position (numerical aperture) of a diaphragm 20 disposed in an imaging optical system in the lens apparatus 12, and transmitted from the CPU 14 of the camera body 10 to the CPU 16 of the lens apparatus 12. In addition, the imaging optical system included in the lens apparatus is an optical system which forms an object image on an imaging area of an image sensing element of the camera body 10.

Now, a configuration of diaphragm control shown in the lens apparatus 12 in FIG. 1 will be described. The diaphragm 20 disposed in the imaging optical system of the lens apparatus 12 is linked to a motor 22, and driven to be opened or closed by the motor 22. The motor 22 is connected to the CPU 16 through an amplifier 24 and a D/A converter 26. When a drive signal output by the CPU 16 is converted into an analogue signal and input to the amplifier 24 by the D/A converter 26, then, at a rotational speed corresponding to a value of the drive signal, the motor 22 rotates to drive the diaphragm 20 to be opened or closed. On the one hand, to the motor 22, a potentiometer 28 for detecting a position of the diaphragm 20 is linked, and a position signal indicating the position of the diaphragm 20 output by the potentiometer 28 is input to the CPU 16 through an A/D converter 30. Accordingly, the CPU 16 can control the motor 22 while grasping the current position of the diaphragm 20 to place the diaphragm 20 at a desired position.

Further, the position of the diaphragm 20 is controlled by the CPU 16 of the lens apparatus 12 according to a value of the iris control signal provided by the camera body 10. The CPU 16 can perform any of a process for controlling the diaphragm 20 according to the value of the iris control signal after acquiring the iris control signal from the camera body 10 through the serial communication depending on a type of the camera body 10 (controlling through the serial communication) and a process for controlling the diaphragm 20 according to the value of the iris control signal after acquiring the iris control signal from the camera body 10 through the parallel communication (controlling through the parallel communication). Because the camera body 10 in this embodiment transmits the iris control signal through the parallel communication, the CPU 16 of the lens apparatus 12 acquires the iris control signal from the CPU 14 of the camera body 10 through the parallel communication. Then, this value of a parallel control signal is set as a value indicating a target position of the diaphragm 20 and the diaphragm is placed at a position represented by the value.

However, in the process in which the CPU 16 controls the position of the diaphragm 20, a control parameter (variable) for indicating the target position of the diaphragm 20 is used in a program, and a control parameter used for controlling through the parallel communication is defined as IrisCtrlPara, and a control parameter used for controlling through the serial communication is defined as IrisCtrlSerial. In this embodiment, because controlling is performed through the parallel communication, the CPU 16 sets the value of the iris control signal acquired from the CPU 14 of the camera body 10 through the parallel communication to the control parameter IrisCtrlPara for the parallel communication, and controls the position of the diaphragm 20 to place it at a position corresponding to the value set in the control parameter IrisCtrlPara. On the contrary, assuming that the position of the diaphragm 20 is controlled through the serial communication, a value of the iris control signal acquired from the CPU 14 of the camera body 10 through the serial communication is set to the control parameter IrisCtrlSerial for the serial communication, and thereby, the position of the diaphragm 20 is controlled to be placed at a position corresponding to the value set in the control parameter IrisCtrlSerial.

When, in such a manner, the CPU 16 controls some controlled object through the parallel communication, and at the same time, performs the serial communication, then, a communication error sometimes occurs in the serial communication. At this time, assuming that some controlled object is controlled through the serial communication, this controlled object is stopped once to be controlled and only the controlled object which has been controlled through the parallel communication is controlled. Then, the CPU 16 tries to resume the serial communication with the CPU 14 of the camera body 10, and once the resumption is accomplished (communication start), according to arrangements with the camera body 10, the CPU 16 switches all the controlled objects including the controlled object to be controlled through the parallel communication to under controlling through the serial communication. Because it is specified that, at the communication start, a control parameter indicating a target state such as the target position of each controlled object is set to a predetermined initial value, or set to a value immediate before the communication error occurs, conventionally, a drawback arises that when the serial communication is resumed, the controlled object to be controlled through the parallel communication goes to be in a different state from before, subsequently, after an elapse of a predetermined time, the serial communication is replaced with the parallel communication and the original state is recovered. On the one hand, in this embodiment, in order that the controlled object to be controlled through the parallel communication is not affected by such an effect caused due to a communication error in the serial communication, the following countermeasure is taken.

A process in this embodiment which the CPU 16 conducts for the diaphragm 20 to be controlled through the parallel communication as described above will be described with reference to a flow chart shown in FIG. 2.

Once the CPU 16 starts parallel communication and serial communication with the CPU 14 of the camera body 10, it acquires a value (a) of an iris control signal from the CPU 14 of the camera body 10 through the parallel communication (step S10). Then, this value (a) is set as a value when a control parameter IrisCtrlSerial for the serial communication is set to an initial value (communication start) (step S12). Subsequently, a value (a) of an iris control signal acquired through the parallel communication is set to a control parameter IrisCtrlPara for the parallel communication (IrisCtrlPara=a), and controlling of the diaphragm 20 is carried out according to the control parameter IrisCtrlPara for the parallel communication (step S14). The processes described above are repeated, and thereby, when a communication error occurs in the serial communication and resumption of the serial communication is accomplished, then, even if the control parameter IrisCtrlSerial for the serial communication is set to an initial value and controlling of the diaphragm 20 is transferred to controlling through the serial communication, the drawback can be avoided that the position of the diaphragm 20 is changed at the time of resumption of the serial communication, because this initial value is coincident with the value of the control parameter IrisCtrlPara for controlling through the parallel communication, which has been used for control.

As described above, in relation to the controlling of the diaphragm to be controlled through the parallel communication, the case where an effect due to a communication error in the serial communication is eliminated has been described, but the present invention may be applied to controlling of all the controlled objects to be controlled through the parallel communication in a manner similarly to the embodiment described above.

Figure 2:
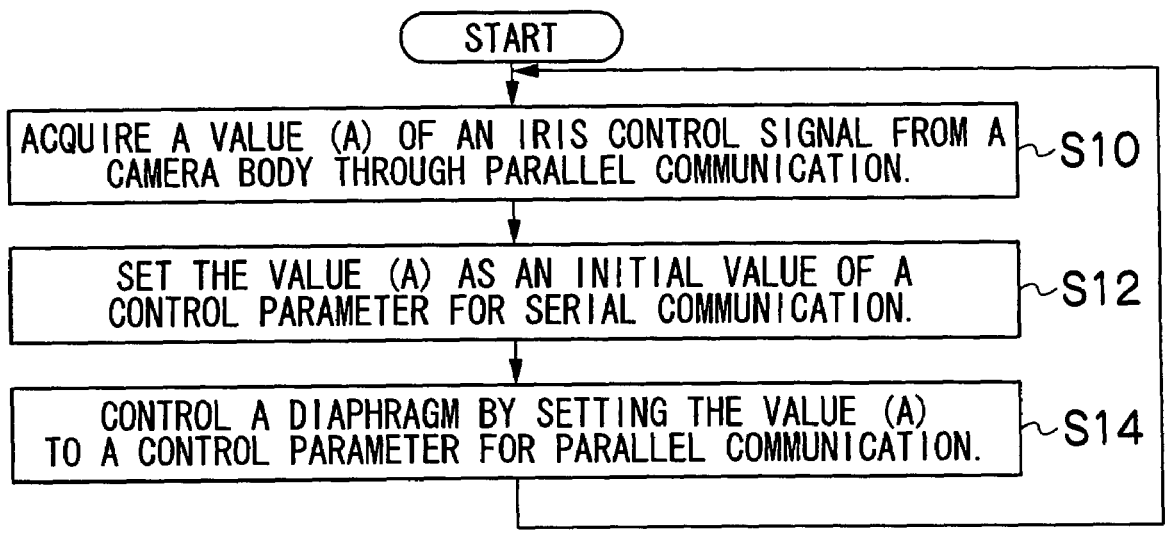
FIG. 2 is a flow chart illustrating processing procedures by a CPU in the lens apparatus.

Moreover, in the processes in FIG. 2, the initial value set to the control parameter for the serial communication is updated sequentially using the value of the control signal acquired through the parallel communication, but only when a communication error occurs in the serial communication, the value may be updated.

What is claimed is:

1. A lens apparatus removably attached to a camera body and including an optical system for forming an object image on an image sensing element of the camera body, comprising:
   a parallel control device which controls a predetermined controlled object based on a control signal provided by the camera body through parallel communication, and
   a serial control device which controls the controlled object based on a control signal provided by the camera body through serial communication, wherein when the controlled object is controlled by the parallel control device, once the serial communication is started, the controlled object is set to a predetermined initial value for the case where the controlled object is controlled by the serial control device, and subsequently, the controlling is shifted to controlling of the parallel control device,
   the lens apparatus further comprising:
   an initial value changing device which changes an initial value based on the control signal provided through the parallel communication, when the controlled object is controlled by the parallel control device, wherein the initial value is changed without changing a state of the controlled object, even if, at the start of the serial communication, the controlled object is set to a predetermined initial value for the case where the controlled object is controlled by the serial control device.

2. The lens apparatus according to claim 1, wherein the controlled object is a diaphragm of the imaging optical system.

* * * * *